United States Patent Office 3,356,105
Patented Dec. 5, 1967

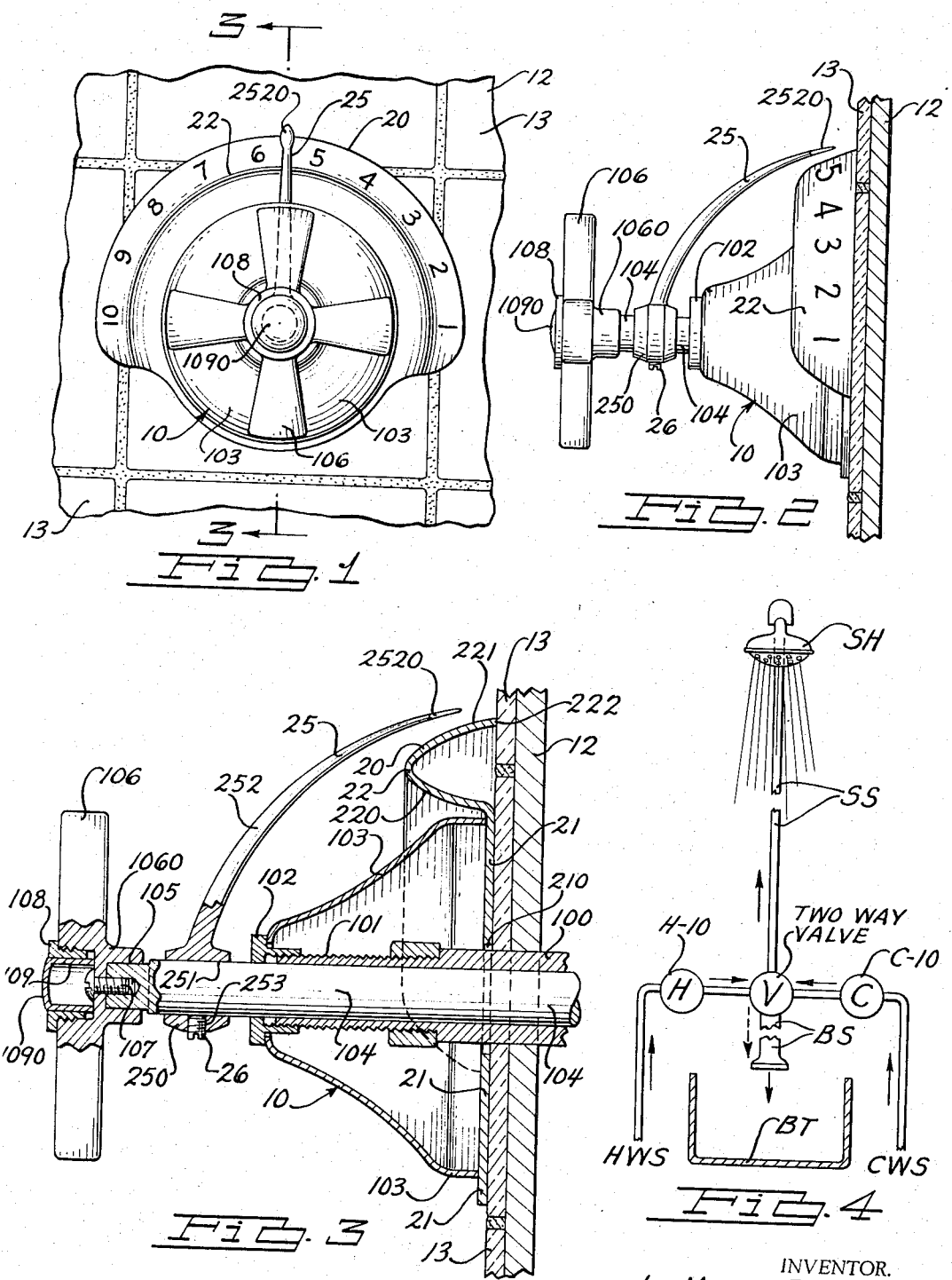

3,356,105
SHOWER AND BATH TEMPERATURE SELECTOR MEANS
La Marr Ferguson, 17606 Greenview, Detroit, Mich. 48219
Filed Oct. 13, 1965, Ser. No. 495,641
2 Claims. (Cl. 137—556.3)

ABSTRACT OF THE DISCLOSURE

An auxiliary shower and bath temperature selector applicable to conventional non-indicating bath tub and/or shower hot and cold water valve installations consisting of a plastic dial readily fixable by the standard ornamental cover element of each of the hot and cold water valves and a pointer element readily fixable to each valve stem whereby the extent of valve opening of the hot and cold water valves providing a selected temperature of water mixture is indicated, and, when each valve is subsequently opened to the desired indicated extent, water is provided at the corresponding selected temperature from a conventional shower head or the bath tub filler spout to which both the hot and cold water valves are connected.

---

This invention relates to means for selecting a desired temperature of water from a shower head supplied thereto through existing hot and cold water supply lines under control of existing volumetric flow control type hot and cold water valves, all without alteration to the said existing plumbing or valves. While the invention will be described herein as a shower temperature selector means, it is equally applicable to means for selecting the desired temperature of bath water drawn for bathing purposes in a conventional bathtub.

The primary object of the invention is to provide, in combination with a conventional shower head or bathtub spigot and hot and cold water supply lines thereto regulated by conventional manually operated volumetric flow control valves in said hot and cold water supply lines, accessory means readily mountable on each said volumetric flow control valve for indicating a selected hot and cold water mix which, when once established, may be conveniently and readily repeated from time to time as the shower or bathtub is subsequently used.

Other objects of the invention will become apparent by reference to the following detailed description taken in connection with the accompanying drawings, in which:

FIG. 1 is a front elevational view of a conventional hot or cold water valve of the type generally used in the hot and cold water supply lines to a shower head, the shower temperature selector of the invention having been mounted thereon.

FIG. 2 is a side elevational view of the construction shown in FIG. 1.

FIG. 3 is a vertical sectional view taken on the line 3—3 of FIG. 2.

FIG. 4 is a piping diagram of a conventional shower-bathtub installation commonly used when the same hot and cold water valves are employed for either shower or bathtub purposes.

Referring now to the drawings wherein like reference numerals refer to like and corresponding views throughout the several views, the particular embodiment of the shower-bathtub temperature selector of the invention disclosed for illustrative purposes is described herein in connection with a typical ON-OFF volumetric flow control valve 10 of a type normally employed in each of the hot and cold water lines in a conventional shower installation over a bathtub.

Only so much of an ON-OFF volumetric flow control valve 10 necessary to illustrate the invention is shown in FIGS. 1–3 inclusive. The valve stem sleeve 100 extends through the shower wall 12 which is preferably tiled at 13. The said valve stem sleeve 100 is threaded at its outer end at 101 to accommodate a cap nut 102 normally employed to hold the ornamental cover element 103 in seated relationship against the face of the tile wall 13. The valve stem 104 extends outwardly from the valve stem sleeve 100 and is preferably flattened on four sides at 105 to telescopingly accommodate the central hub 1060 of a conventional valve handle 106 fixed axially to the end thereof by a suitable anchor screw 107. The said central hub 1060 of the valve handle 106 is bored and threaded to receive a hollow nut 108 having a central thimble 109 indicating "H" or "C" on its face 1090 to designate which of two flow control valves 10 control the flow of hot or cold water to the shower head.

The shower temperature selector means of the instant invention consists of an indicia element 20 and a pointer element 25. The said indicia element 20 is mounted in the desired fixed position with respect to the tile 13 of the shower wall 12 and the valve stem sleeve 100 of the volumetric flow control valve 10. The pointer element 30 is fixed to the valve stem 104 of the said volumetric flow control valve 10 in a manner to cause it to turn at all times with said valve stem, all as hereinafter descrcibed in detail.

The indicia element 20 is preferably formed of a waterproof plastic or other suitable waterproof material and has a flat base 21 having a central aperture 210 therein to permit its being telescoped over the valve stem sleeve 100 of a volumetric flow control valve 10. Radially extending from the flat base 21 of the indicia element 20 and preferably integral therewith is an arcuate inverted generally V-shaped collar 22 having an inner wall 220 and an outer wall 221, the said outer wall 221 terminating in an arcuate edge 222 disposed parallel to the said base 21. The inner radius of the arcuate inverted V-shaped collar 22 of the indicia element 20 is such that the base of the ornamental cover element 103 of the volumetric flow control ON-OFF valve 10 will seat on the said base 21 of the indicia element 20 without interference with the said arcuate V-shaped collar 22 thereof. The outer wall 221 of the said V-shaped collar 22 of the indicia element 20 is preferably provided with a suitable preferably evenly spaced indicia thereon, which indicia is shown in FIGS. 1 and 2 as numerals 1–10 inclusive.

The pointer element 25 preferably consists of a hub 250 having an axially disposed aperture 251 therethrough and from which extends an arcuately formed round pointer 252 which may be tapered to a relatively small diameter near its outer bulbous pointed end 2520 so that its size will not interfere with "reading" its position with respect to the indicia provided on the indicia element 20. The said hub 250 of the pointer element 25 has a suitable radially disposed aperture 253 therein to accommodate a set screw 26 by means of which the pointer element 25 may be fixed in a position on the valve stem 100 of a volumetric control valve 10 with the pointer 252 thereof pointing to a position just a short distance clockwise from the indicia numeral "1" shown in FIG. 1 when the said volumetric flow control valve 10 is in its OFF position.

Referring now to FIG. 4, the particular conventional shower-bathtub installation shown diagrammatically therein consists of a hot water supply line HWS and a cold water supply line CWS connected through hot and cold ON-OFF volumetric control valves H–10 and C–10 respectively in FIG. 4 to a two way valve V which directs a mixture of hot and cold water through a shower supply line SS to a shower head SH or through a bathtub spigot BS to a bathtub BT, all according to the position to which the two way valve V is turned.

After first properly mounting a shower-bathtub temperature selector means of the invention on each of the hot and cold ON-OFF volumetric control valves H-10 and C-10 respectively of any conventional shower or shower-bathtub installation, a reading of the shower-bath selector means is taken when the shower temperature is as desired, and alternatively when the tub temperature is as desired. For example, for taking a shower with the initial shower temperature as desired, the shower-bath selector means may read "3" for the H or hot water volumetric selector valve H-10, and "5" for the C or cold water volumetric selector valve C-10. Also, as an example, for taking a bath with the tub initial temperature as desired, the shower-bath selector means may read "6" for the H or hot water volumetric selector valve H-10, and "4" for the C or cold water volumetric selector valve C-10.

Thus, by employing a shower-bathtub temperature selector means of the invention, a rapid desired selection of the temperature of the shower water or the bath water may be made relatively accurately at the time the hot and cold volumetric flow control ON-OFF valves H-10 and C-10 thereto are turned on with the pointer of the said shower-bathtub selector means set in each instance at the proper reading on the indicia thereof, which reading had earlier been established by trial settings during at least one previous shower and during at least one previous bathtub filling.

The use of the shower end bath temperature selector means of the invention presupposes normal cold water supply and hot water supply at or near the temperature normally available to the householder, at least at the beginning of a shower or a bathtub filling. If the supply of hot water diminishes, then a simple manual adjustment of the volume of cold water passing to the shower or bathtub will provide the desired temperature balance. If, as in wintertime, the cold water passing to the shower or tub is at a temperature colder than normal, then a simple manual adjustment of the volume of cold water passing to the shower or bathtub will provide the desired temperature balance. However, in both of the aforesaid instances, the primary selected temperature of water coming from the shower head or the bathtub spigot after setting the volume of hot and cold water by use of hot and cold water selector means of the invention is usually quite close to the normal desired temperature of water from the shower or filling the bathtub.

Although but a single embodiment of the invention has been disclosed and described in detail herein, it is obvious that many changes may be made in the size, shape, arrangement and details of the several elements of the invention, all without departing from the spirit and scope thereof as defined by the appended claims.

I claim:

1. Accessory temperature selector means for establishing the temperature of water in a shower or bath supplied through a common line from hot and cold water supply lines each controlled by an existing hot and cold water volumetric type valve therein designated H and C respectively, each said volumetric valve including a fixed valve stem sleeve extending from a wall, a turnable valve stem extending from said valve stem sleeve, and an ornamental cover element telescoped over said valve stem sleeve, means anchoring said ornamental cover against said wall, and means on each said valve stem for manually turning the same, each said accessory temperature selector means comprising an indicia element telescoped over each said valve stem sleeve disposed between said cover elements and said wall anchored in fixed relationship to said wall by said ornamental cover elements leaving the periphery of said indicia elements exposed, each said indicia element including an extension formed on the exposed periphery thereof including thereon arcuately spaced indicia indicating valve-open settings, a pointer element including a hub telescopable neatly over each said valve stem having a pointer extending therefrom in spaced relationship to the indicia on said indicia means, and means securing each said pointer element at its hub to a valve stem with the pointer thereof pointing to a valve-closed position in respect to the indicia on said indicia means.

2. Temperature selector means as claimed in claim 1 in which the extension of each said indicia element is of an inverted V-shape at the periphery thereof at least to the extent required to accommodate the said indicia thereon.

References Cited

UNITED STATES PATENTS

| 776,769 | 12/1904 | Wisbech | 137—556.3 |
| 1,835,301 | 12/1931 | Hennessey | 4—191 |
| 2,536,275 | 1/1951 | Godshall | 137—556 |

HENRY T. KLINKSIEK, *Primary Examiner.*